United States Patent
Wilsher et al.

(10) Patent No.: US 10,460,624 B2
(45) Date of Patent: Oct. 29, 2019

(54) SYSTEM AND METHOD FOR PRINTING EDIBLE MEDICAMENT DOSAGE CONTAINERS HAVING IDENTIFYING INDICIA AT DISPENSING SITES

(71) Applicant: Xerox Corporation, Norwalk, CT (US)

(72) Inventors: Michael J. Wilsher, Letchworth (GB); Duncan I. Stevenson, St. Albans (GB)

(73) Assignee: Xerox Corporation, Norwalk, CT (US)

( * ) Notice: Subject to any disclaimer, the term of this patent is extended or adjusted under 35 U.S.C. 154(b) by 364 days.

(21) Appl. No.: 15/227,106

(22) Filed: Aug. 3, 2016

(65) Prior Publication Data

US 2018/0036205 A1 Feb. 8, 2018

(51) Int. Cl.

| | |
|---|---|
| *G09B 21/00* | (2006.01) |
| *B33Y 10/00* | (2015.01) |
| *A61J 3/00* | (2006.01) |
| *B29C 64/106* | (2017.01) |
| *B29C 64/182* | (2017.01) |
| *B29L 31/00* | (2006.01) |
| *B33Y 80/00* | (2015.01) |

(52) U.S. Cl.
CPC .............. *G09B 21/00* (2013.01); *A61J 3/007* (2013.01); *B29C 64/106* (2017.08); *B29C 64/182* (2017.08); *B33Y 10/00* (2014.12); *G09B 21/003* (2013.01); *A61J 2205/30* (2013.01); *B29L 2031/753* (2013.01); *B33Y 80/00* (2014.12)

(58) Field of Classification Search
CPC ..... B33Y 10/00; B29C 64/182; B29C 64/106; G09B 21/00
See application file for complete search history.

(56) References Cited

U.S. PATENT DOCUMENTS

| | | | |
|---|---|---|---|
| 2004/0251165 A1* | 12/2004 | Girzaitis | A61J 7/04 206/534 |
| 2007/0259010 A1* | 11/2007 | Yoo | A61K 9/2072 424/400 |
| 2010/0031611 A1* | 2/2010 | Ali | G06F 19/3462 53/467 |
| 2013/0193621 A1* | 8/2013 | Daya | A61K 9/70 264/401 |
| 2014/0134320 A1 | 5/2014 | Chang et al. | |
| 2014/0301179 A1* | 10/2014 | Rich | G06T 9/00 369/275.4 |
| 2016/0120808 A1 | 5/2016 | Hoover et al. | |

* cited by examiner

*Primary Examiner* — Jacob T Minskey
*Assistant Examiner* — Melody Tsui
(74) *Attorney, Agent, or Firm* — Maginot Moore & Beck LLP (57) ABSTRACT

A system and method enables production of medicament containers with edible material at a site for dispensing medicaments. The containers are formed in shapes that indicate the contents of the containers and can be formed with indicia that indicate the times for taking the medicaments. Additionally, the containers can be formed with raised protuberances that provide information regarding the medicaments in the containers. In one embodiment, the raised protuberances are in Braille.

20 Claims, 6 Drawing Sheets

SYSTEM AND METHOD FOR PRINTING EDIBLE MEDICAMENT DOSAGE CONTAINERS HAVING IDENTIFYING INDICIA AT DISPENSING SITES

TECHNICAL FIELD

The present disclosure relates to containers for medicaments and, more particularly, to the printing of edible containers at the point of medicament dispensing.

BACKGROUND

Pharmacists typically dispense medicines that address serious health issues or are controlled substances. The pharmacist removes the liquids and pills identified in a prescription from bulk containers and places them in smaller bottles or other containers. A label is printed that identifies the medicine, the dosage to be taken, and the times at which the dosage is to be taken. The pharmacist applies the printed label to the bottle or container and gives the container to the consumer. In this process, the pharmacist controls the dispensing of the drug and is responsible for ensuring that the correct drug is dispensed as permitted under current regulations. As long as the consumer keeps the container, they can review the information printed on the label. If the consumer removes some of the medicine from the container for convenience, access to the label information is lost. For example, rather than take the entire container to one's work place, a consumer may remove a few pills from the container and carry them to another site in a pocket or non-descript container for taking at a later time. This scenario requires the consumer to either remember the label information or write it down for later referral. Additionally, visually impaired consumers may have difficulty reading printed labels. If a visually impaired person takes two different medications out of different containers having different printed labels to facilitate the transporting of the medications to a work site or other location, they lose the ability to distinguish the medications if they have a similar form. Providing indicia identifying individual dosages of medications or the conditions for their use would be useful.

SUMMARY

A three-dimensional (3D) object printing system is configured to produce dosage carriers with identifying indicia at a medication dispensing site. The system includes a database in which container configuration data for a plurality of medicament containers are stored, a computer having an interface configured to select container configuration data from the database for a medicament to be dispensed and to receive data corresponding to times for taking doses of the medicament, a three-dimensional (3D) object printer operatively connected to the computer to receive container configuration data and data corresponding to time for taking doses of the medicament, the 3D object printer operating with reference to the container configuration data and the data corresponding to time for taking doses of the medicament to form at least one container with edible material and having indicia indicating at least one time for taking the medicament.

A method of operating a three-dimensional (3D) object printer produces dosage carriers with identifying indicia at a medication dispensing site. The method includes using a computer and interface to select container configuration data from a database for a medicament to be dispensed, entering data corresponding to times for taking doses of the medicament with the computer and interface, sending the container configuration data and the entered data to a three-dimensional (3D) object printer, and operating the 3D object printer with reference to the container configuration data and the entered data to form at least one container with indicia indicating at least one time for taking the medicament, the at least one container being formed with edible material.

BRIEF DESCRIPTION OF THE DRAWINGS

The foregoing aspects and other features of a 3D object printer that produces dosage carriers with identifying indicia are explained in the following description, taken in connection with the accompanying drawings.

DETAILED DESCRIPTION

For a general understanding of the present embodiments, reference is made to the drawings. In the drawings, like reference numerals have been used throughout to designate like elements. As used herein, the terms "3D object printing" or a "3D object printer" refer to processes and machines capable of forming three-dimensional shapes from a model by the sequential application of successive layers of a media. The 3D object printing process is performed under computer control based on container configuration data of the desired 3D shape stored in a memory. As used herein, the 3D object printer includes a computer controller with a memory and components for forming a product layer by layer under computer control. As used herein, an "forming material" that can be used to produce a product is defined as a settable composition that can be provided with a viscosity sufficiently low to be readily ejected or extruded from one or more ejectors or extruders mounted on a movable carriage in the 3D object printer or as a solid composition that changes to a low viscosity when heated so it can be ejected from ejectors or extruded from extruders and then harden as it cools.

One example of a suitable 3D object printer is the "CubeX™" 3D printer sold by 3D Systems, Inc. The CubeX™ 3D printer is configured to produce 3D models from PLA or ABS plastic in layer thicknesses of 0.1-0.5 mm. The plastic material is heated within reservoirs in the printer to achieve a viscosity that enables the material to be fed under pressure to one or more ejectors or extruders and discharged in a controlled pattern to form a thin layer of material. The carriage supporting the ejectors or extruders is raised after formation of each layer to maintain a predetermined distance between the ejectors or extruders and the top layer of the product being formed. Certain modifications to the 3D object printer may be necessary to accommodate the use of edible material as the forming material. At a minimum, the working components are configured for cleaning and sterilization to meet food handling regulations. Modifications to the heating protocol, material reservoir, passageways to the ejectors or extruders, and the ejectors or extruders may also be warranted to handle materials approved for human consumption. Additionally, other forms of printer are configured to extrude viscous liquids, for example, chocolate, sugar icing and the like. Such printers and materials are also suitable for printing the containers.

The embodiments disclosed herein relate to the preparation of edible containers for single doses of medicaments that retain medicament identifying information and optionally make the medications more visually appealing. These embodiments are particularly useful to pharmacists or other personnel authorized to dispense medications to consumers who take the medications with them for later consumption. The embodiments provide a system and method for "building" an edible container for a single dose of a medicament, whether in pill or liquid form, using a 3D object printer and 3D object printing process. In particular, a model corresponding to a particular edible container is generated according to the nature, size and shape of the medicament and other parameters. The additional parameters may include securing the medicament within the container, the exterior configuration of the container, the fluid properties of the material used to form the container, and the like. Because the 3D object printer discussed below does not add the drug into the container manufactured by the printer, the printer does not require any special certification because responsibility for identifying and dispensing a drug to a consumer is already covered by the pharmacist's license.

Figure 1:
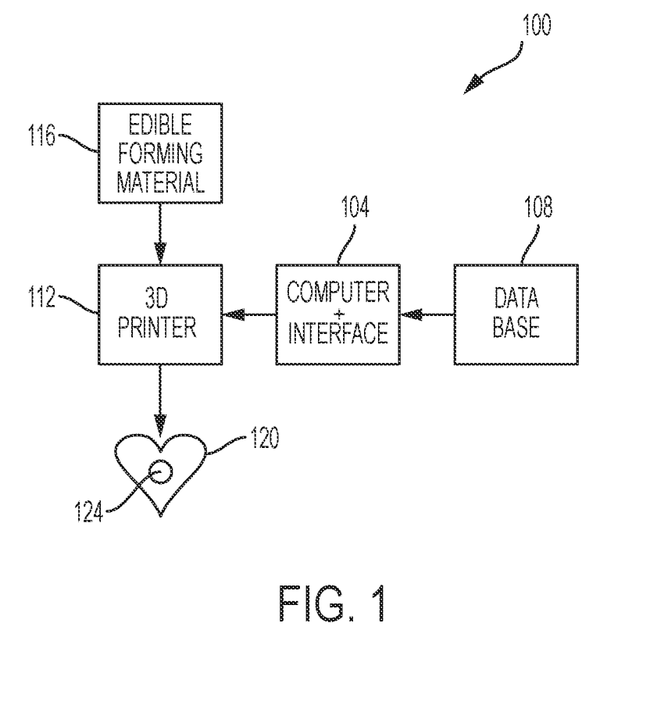
FIG. 1 illustrates a system configured to produce edible medicament containers at a site where the medicaments are dispensed.

An embodiment of such a printer is shown in FIG. 1. The system 100 includes a computer having an interface 104 that is operatively connected to a database 108 and a 3D object printer 112. The 3D object printer 112 is connected to a source of forming material 116 that can consumed by humans. Using data input by an operator into the interface of the computer as well as data received through the computer and interface 104 from the database 108, the 3D object printer is operated to form a dosage container 120 layer by layer using the forming material provided from source 116. In this example, the container 120 is made with a heart shape to indicate the medicament placed within recess 124 is heart medication. Of course, other shapes and configurations can be used for similar purposes. Additionally, the back surface of the container can be printed with indicia that identify the time for the dosage to be taken and the like.

The source 116 can be a reservoir that is separate from or part of the 3D object printer 112. In one embodiment, the source 116 is configured to contain a plurality of different consumable forming materials with a fluid transfer mechanism configured to convey one of the materials to the 3D object printer 112 that was identified by the data received from the computer and interface 104. For instance, the forming material can be a form of gelatin that softens in response to the application of heat and then sets when the heat is removed. The plurality of materials contained within the source 116 can be the same gelatin composition with different flavorings or they may be different types of gelatin. A wide array of forming materials are contemplated for use in the system 100 and include chocolate, sugar, and other human consumable materials that can be colored with food colorings for differentiating containers.

The 3D object printer 112 can incorporate an internal controller configured to execute programmed instructions stored in a memory within the printer for controlling the components of the 3D object printer as is known in the art. The computer and interface 104 enable an operator, such as a pharmacist, to select container shapes and colors from files stored in the database 108. The database 108 is a memory configured for record storage and retrieval that can be part of the computer and interface 104, contained in a separate storage device, or accessible in the "cloud" or other offsite storage using cloud computing or internet access schemes. The computer and interface 104 is also configured with programmed instructions stored in memory that enable the operator to identify data for printing on the container 120. Additionally, the computer and interface 104 can be configured with programmed instructions that enable the operator to enter dimensional properties for a container, if an appropriate container configuration is not found in the database 108.

Shapes for the containers made by system 100 are stored in the database 108 in typical 3D object file formats. These formats are well known and are identified by extensions that include .stl, .dae, .amf, and .obj; native file formats, such as solidworks, NX; and generic formats, such as parasolid, IGES, and step files. Data entered by the operator that are to printed on the container are converted into a compatible format that define layers of material that are printed on the container 124 to provide indicia on the container. Also, the consumer can choose the design at the point of dispensing with his or her specific preferences.

Figure 2:
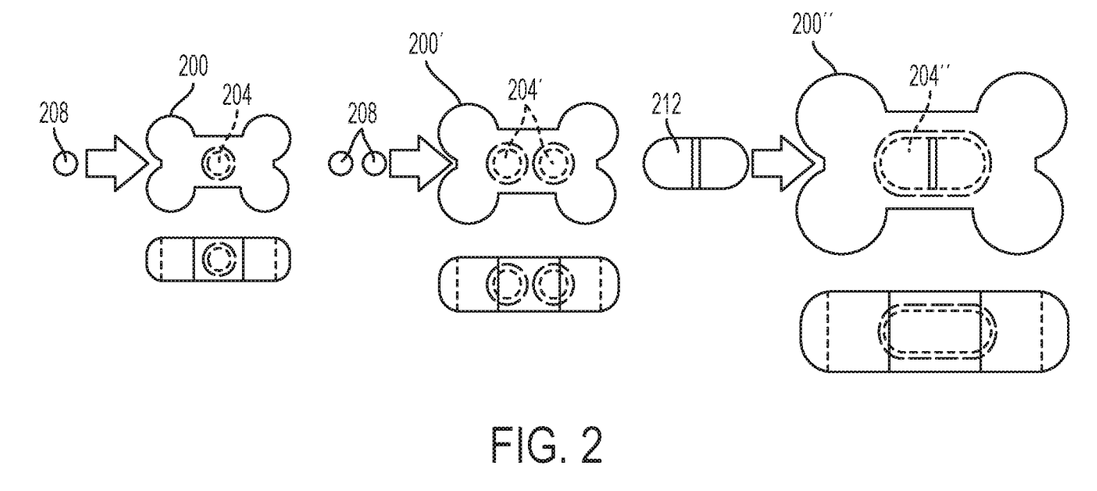
FIG. 2 depicts examples of different container shapes that can be produced by the system of FIG. 1.
Figure 3:
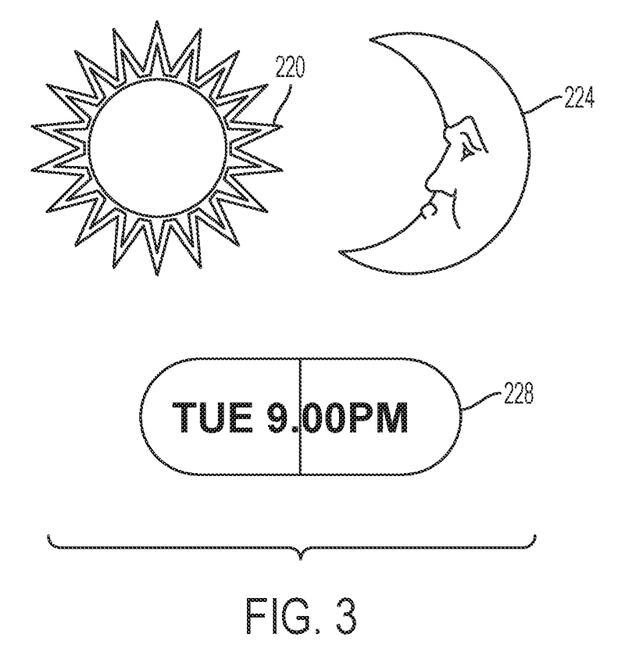
FIG. 3 depicts examples of container configurations that can be used to identify dosage times.

By way of example, different configurations of medicaments and edible containers are shown in FIG. 2. In one example, the edible shell 200 is produced to define an interior cavity 204 that is sized to receive a generally spherical medicament 208. The shell 200' is provided with two interior cavities 204' to receive two spherical medicaments 208. An oblong medicament 212 is received within an appropriately configured cavity 204" in the edible shell 200". In the illustrated examples, the shells 200, 200', and 200" have the shape of a bone to indicate the medicament is a medication for osteoporosis. Other container shapes are possible, such as the sun shape 220, the moon shape 224, or a two part capsule shape 228 shown in FIG. 3. The sun shape 220 indicates the medicament stored in it is to be taken in the morning, while the moon shape 224 indicates the medicament stored in it is to be taken in the evening. The capsule shape is too generic to indicate a time for the medicament to be taken, but a date and time can be printed on the container 228 as shown in the figure. Moreover, other container shapes are possible, such as ones shaped to resemble other body parts as indicators for the medicament stored in the container. The containers can be provided in other sizes as well, which require adjustment of the dimensions of the containers and the cavities or recesses in the containers by the operator through the computer and interface 104. The computer interface may be as simple as automatically printing from a file on an inserted memory card.

Figure 4:
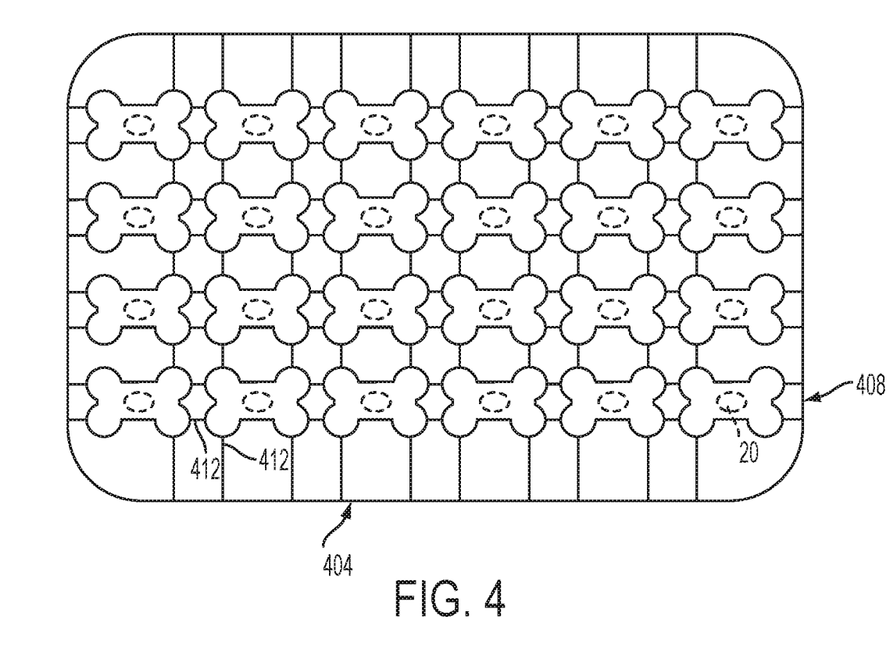
FIG. 4 depicts an example of an array of containers that the system of FIG. 1 can produce.

To accommodate a two week regimen of an antibiotic or the like, the 3D object printer is configured to produce an array of consumable containers, such as the array of containers 400 shown in FIG. 4. The array 400 includes a plurality of containers 200 in a support structure 404, which includes an outer frame 408 and supporting spars 412. The spars 412 are integrally printed with the containers but have a reduced cross-section so that the containers 200 can be readily severed from the spars 412. The spars 412 are arranged to support the plurality of containers in the array for removal from the 3D object printer and to maintain the integrity of the array as it is formed layer-by-layer by the 3D object printer. The operator can cut the containers from the spars using a knife. Alternatively, the containers can be pressed from the array so the containers mechanically separate from the spars without the use of a knife.

As is known, a 3D data model is derived to control the operation of the 3D object printer 112. The controller of the printer executes the programmed instructions to receive container configuration data from the database 108 through the computer and interface 104 and moves the ejectors or extruders while operating the ejectors or extruders to form one or more containers layer by layer. Additionally, the operator can input alterations to the container design and add indicia to be printed on the surface of the container. The container configuration data received and altered can include support structure 404 according to a predetermined protocol to produce an array of containers, such as the array 400 shown in FIG. 4.

Figure 5:
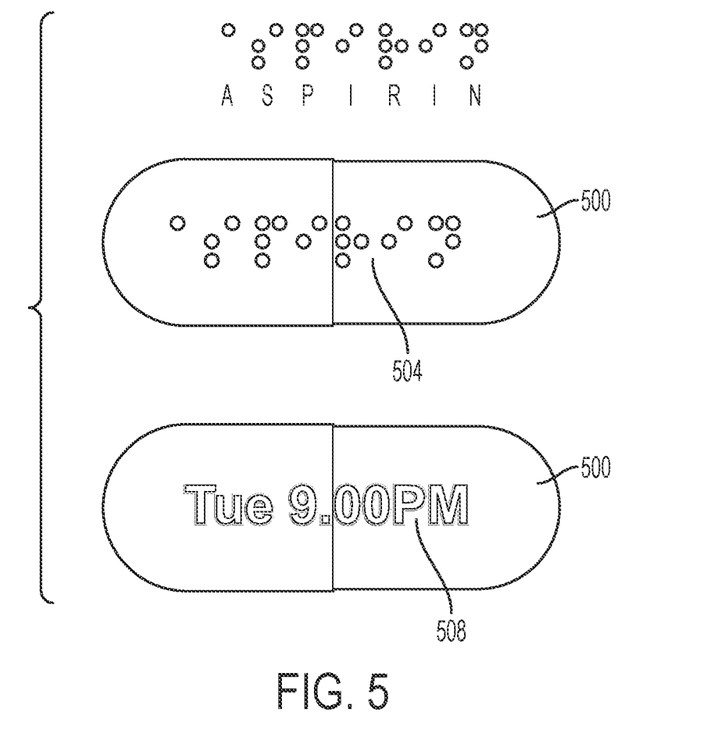
FIG. 5 illustrates examples of indicia that the system of FIG. 1 can form on edible containers.

In one embodiment of the system 100, the operator enters data through the computer and interface 104 that identifies the consumer of the medicament as being visually impaired. In response, the computer and interface 104 modifies indicia indicating dosage taking times and other information provided with the container to a form that is comprehensible by visually impaired persons. For example, the indicia to be printed on the container can be converted to Braille indicia. As shown in FIG. 5, a capsule container 500 is formed with Braille indicia 504 that identifies the content of the capsule as aspirin. The data regarding the Braille indicia is used to modify the container configuration data to add layers that form the protuberances on the surface of the container that identify the contents of the container. Alternatively, alphanumeric characters 508 can also be formed with protuberances on the capsule 500 to facilitate reading of the indicia by visually impaired persons. Due to the small size of some medications, a Braille abbreviation or other distinct tactile features may serve for identification purposes.

Figure 6:
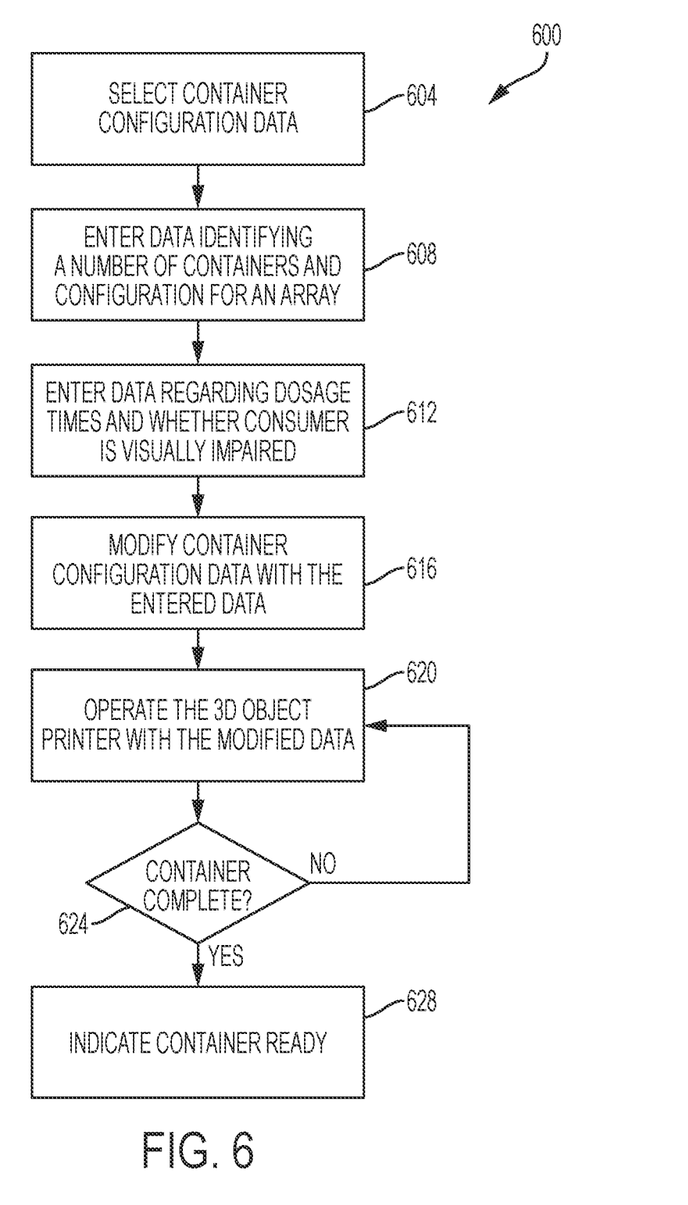
FIG. 6 is a flow diagram of a process for operating the system of FIG. 1.

A flowchart of a process 600 for operating system 100 is shown in FIG. 6. After viewing the prescription, the operator of the computer and interface 104 selects appropriate container configuration data from the database 108 for the medicament identified in the prescription (block 604). The operator also enters data regarding the number of containers to be produced and the configuration of an array of the containers (block 608). Data regarding the times for taking doses of the medicament or whether the consumer is visually impaired are entered (block 612) and the data are used to modify container configuration data to indicate time for taking doses, either symbolically or with printed indicia (block 616). As noted above, the printed indicia can be provided in alphanumeric characters or as codes commonly known to the visually impaired, such as Braille. These data are sent to the 3D object printer 112 and the controller in the printer executes programmed instructions with reference to the container configuration data to form one or more containers in a layer by layer manner (block 620). Once the formation of the containers is complete (block 624), the system signals that the containers are ready for removal from the printer (block 628) so the medicaments can be placed in the containers by the system operator.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for producing medicament containers at a dispensing site comprising:
    using a computer and interface to select single dose medicament container configuration data from a database for a single dose medicament container that corresponds to a medicament to be dispensed, the single dose medicament container configuration data corresponding to a single dose medicament container for the medicament without the medicament;
    entering with the computer and interface data corresponding to a number of the single dose medicament containers to make and at least one time for taking single doses of the medicament;
    sending the single dose medicament container configuration data and the entered data to a three-dimensional (3D) object printer; and
    operating the 3D object printer with reference to the single dose medicament container configuration data and the entered data to form with edible material only the entered number of single dose medicament containers without the medicament in any of the single dose medicament containers and forming at least one of the single dose medicament containers with indicia indicating one time in the at least one time for taking a single dose of the medicament to be placed in the at least one single dose medicament container.

2. The method of claim 1, the entering of the data further comprising:
    entering through the computer and interface data for a configuration of an array of the number of single dose medicament containers; and
    the operation of the 3D object printer further including production of an array of the single dose medicament containers corresponding to the data for the configuration of the array and having the entered number of single dose medicament containers.

3. The method of claim 1 further comprising:
    modifying the single dose medicament container configuration data with reference to the data corresponding to the one time in the at least one time for taking the single dose of the medicament; and
    operating the 3D object printer with reference to the modified single dose medicament container configuration data to produce the at least one single dose medicament container with the indicia.

4. The method of claim 1 further comprising:
    entering through the computer and interface data regarding visually impairment of a person receiving the single dose medicament containers;
    modifying the selected single dose medicament container configuration data with reference to the data corresponding to the one time in the at least one time for taking the single dose of the medicament and the data regarding visually impairment of the person receiving the single dose medicament containers; and
    operating the 3D object printer with reference to the modified single dose medicament container configuration data to produce the at least one single dose medicament container with raised protuberances corresponding to the indicia in response to the data being entered that the person receiving the single dose medicament containers is visually impaired.

5. The method of claim 4 wherein the raised protuberances correspond to a code for assisting visually impaired persons.

6. The method of claim 5 where the raised protuberances correspond to Braille.

7. The method of claim 4 wherein the raised protuberances correspond to alphanumeric characters.

8. The method of claim 1, the operation of the 3D object printer further comprising:
forming the at least one single dose medicament container as a sun symbol when the one time indicates daytime for taking the single dose of the medicament to be placed in the at least one single dose medicament container.

9. The method of claim 1, the operation of the 3D object printer further comprising:
forming the at least one single dose medicament container as a moon symbol when the one time in the at least one time indicates nighttime for taking the single dose of the medicament to be placed in the at least one single dose medicament container.

10. The method of claim 1, the operation of the 3D object printer further comprising:
forming the single dose medicament containers as a body part symbol to indicate the medicament to be placed in the at least one single dose medicament container formed with the indicia.

11. A system for producing medicament containers at a dispensing site comprising:
a database in which single dose medicament container configuration data for a plurality of single dose medicament containers are stored, the single dose medicament container configuration data corresponding to a single dose medicament container for a medicament without the medicament;
a computer having an interface configured to receive data identifying a medicament to be dispensed, to select single dose medicament container configuration data from the database for the medicament to be placed in the single dose medicament container, and to receive data corresponding to a time for taking single doses of the medicament; and
a three-dimensional (3D) object printer operatively connected to the computer to receive the selected single dose medicament container configuration data and data corresponding to the time for taking single doses of the medicament, the 3D object printer operating with reference to the selected single dose medicament container configuration data and the data corresponding to the time for taking single doses of the medicament to form with edible material only at least one single dose medicament container without the medicament and the at least one single dose medicament container having indicia indicating the time for taking single doses of the medicament.

12. The system of claim 11, the computer having the interface being further configured to receive data for a number of single dose medicament containers to be produced and a configuration of an array of the number of single dose medicament containers; and
the 3D object printer operating with reference to the data for a number of single dose medicament containers to be produced and the configuration of the array of the number of single dose medicament containers to produce an array of single dose medicament containers having the entered number of single dose medicament containers.

13. The system of claim 11, the computer having the interface being further configured to:
modify the selected single dose medicament container configuration data with reference to the data corresponding to the time for taking single doses of the medicament; and
the 3D object printer operating with reference to the modified selected single dose medicament container configuration data to produce the at least one single dose medicament container with the indicia.

14. The system of claim 11, the computer having the interface is further configured to:
receive data regarding visually impairment of a person receiving the container;
modify the selected single dose medicament container configuration data with reference to the data corresponding to the time for taking single doses of the medicament and the data regarding visually impairment of the person receiving the container; and
the 3D object printer operating with reference to the modified selected single dose medicament container configuration data to produce the at least one single dose medicament container with raised protuberances in response to the data being entered that the person receiving the single dose medicament containers is visually impaired.

15. The system of claim 14 wherein the 3D object printer operates to produce the at least one single dose medicament container with raised protuberances that correspond to a code for assisting visually impaired persons.

16. The system of claim 15 wherein the 3D object printer operates to produce the at least one single dose medicament container with raised protuberances that correspond to Braille.

17. The system of claim 14 wherein the 3D object printer operates to produce the at least one single dose medicament container with raised protuberances that correspond to alphanumeric characters.

18. The system of claim 11 wherein the operation of the 3D object printer with reference to the selected single dose medicament container configuration data and the data corresponding to the time for taking single doses of the medicament forms the single dose medicament container as a sun symbol to indicate daytime taking of the single dose medicament container.

19. The system of claim 11 wherein the operation of the 3D object printer with reference to the selected single dose medicament container configuration data and the data corresponding to the time for taking single doses of the medicament forms the single dose medicament container as a moon symbol to indicate nighttime taking of the single dose medicament container.

20. The system of claim 11, the operation of the 3D object printer with reference to the selected single dose medicament container configuration data and the data corresponding to the time for taking single doses of the medicament forms the single dose medicament container as a body part symbol to indicate the medicament stored in the single dose medicament container.

* * * * *